US009332270B2

(12) United States Patent
Ju

(10) Patent No.: US 9,332,270 B2
(45) Date of Patent: May 3, 2016

(54) APPARATUS CAPABLE OF PERFORMING BOTH BLOCK-MATCHING MOTION COMPENSATION AND GLOBAL MOTION COMPENSATION AND METHOD THEREOF

(75) Inventor: Chi-Cheng Ju, Hsin-Chu (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 1497 days.

(21) Appl. No.: 12/652,747

(22) Filed: Jan. 6, 2010

(65) Prior Publication Data

US 2010/0104020 A1 Apr. 29, 2010

Related U.S. Application Data

(63) Continuation of application No. 10/605,882, filed on Nov. 4, 2003, now abandoned.

(51) Int. Cl.
*H04N 11/02* (2006.01)
*H04N 19/527* (2014.01)
*H04N 19/523* (2014.01)

(52) U.S. Cl.
CPC ........... *H04N 19/527* (2014.11); *H04N 19/523* (2014.11)

(58) Field of Classification Search
None
See application file for complete search history.

(56) References Cited

U.S. PATENT DOCUMENTS

| | | | |
|---|---|---|---|
| 4,998,168 A * | 3/1991 | Gillard | 348/451 |
| 5,473,379 A | 12/1995 | Horne | |
| 6,008,852 A | 12/1999 | Nakaya | |
| 6,256,343 B1 * | 7/2001 | Suzuki | 375/240 |
| 6,385,245 B1 | 5/2002 | De Haan et al. | |
| 6,483,877 B2 | 11/2002 | Nakaya | |
| 6,775,326 B2 | 8/2004 | Sekiguchi et al. | |
| 7,006,571 B1 * | 2/2006 | Nakaya | 375/240.16 |
| 7,206,346 B2 * | 4/2007 | Shimizu et al. | 375/240.17 |
| 7,602,848 B2 * | 10/2009 | Panusopone | 375/240.16 |
| 2001/0050957 A1 | 12/2001 | Nakaya et al. | |
| 2003/0202594 A1 | 10/2003 | Lainema | |

(Continued)

FOREIGN PATENT DOCUMENTS

| | | |
|---|---|---|
| DE | 693 24 735 T2 | 10/1999 |
| DE | 698 17 460 T2 | 6/2004 |

(Continued)

*Primary Examiner* — Christopher S Kelley
*Assistant Examiner* — Christopher Findley
(74) *Attorney, Agent, or Firm* — Winston Hsu; Scott Margo

(57) ABSTRACT

An interpolation unit receives an incoming video bit stream comprising a plurality of frames including first macroblocks encoded using block-matching motion compensation and second macroblocks encoded using global motion compensation. A translation unit converts global motion parameters included in a current frame of the incoming video bit stream into a global motion vector. The interpolation unit performs luminance and chrominance interpolation operations on each macroblock contained in each frame of the incoming video bit stream. When processing a current macroblock, if the current macroblock is encoded using global motion compensation, the interpolation unit performs the luminance interpolation operations according to the global motion vector at half-pel resolution, and performs the chrominance interpolation operations at quarter-pel resolution. If the current macroblock is encoded using block-matching motion compensation, the interpolation unit performs the luminance and chrominance interpolation operations according to the macroblock motion vector contained in the current macroblock at half-pel resolution.

10 Claims, 5 Drawing Sheets

(56) References Cited

U.S. PATENT DOCUMENTS

2003/0202595 A1 10/2003 Suzuki
2003/0202607 A1 10/2003 Srinivasan
2004/0223550 A1 11/2004 Hagiwara
2005/0013497 A1 1/2005 Hsu et al.

FOREIGN PATENT DOCUMENTS

| EP | 0 797 357 A2 | 9/1997 |
| WO | WO 03019950 | 3/2003 |
| WO | 03047268 A | 6/2003 |

\* cited by examiner

X: Integer pixel position

O: Half pixel position

APPARATUS CAPABLE OF PERFORMING BOTH BLOCK-MATCHING MOTION COMPENSATION AND GLOBAL MOTION COMPENSATION AND METHOD THEREOF

CROSS REFERENCE TO RELATED APPLICATIONS

This continuation application claims the benefit of co-pending U.S. patent application Ser. No. 10/605,882, filed on Nov. 4, 2003 and incorporated herein by reference.

BACKGROUND OF INVENTION

1. Field of the Invention

The invention relates to digital video, and more particularly, to decoding a coded video bit stream having both macroblocks encoded using block-matching motion compensation and macroblocks encoded using global motion compensation.

2. Description of the Prior Art

Full-motion video displays using analog video signals have long been available in the form of television. With recent advances in computer processing capabilities and affordability, full-motion video displays using digital video signals are becoming more widely available. Digital video systems provide significant improvements over conventional analog video systems in creating, modifying, transmitting, storing, and playing full-motion video sequences.

However, the amounts of raw digital information included in video sequences are massive. Storage and transmission of these amounts of video information is infeasible with conventional personal computer equipment. Consider, for example, a digitized form of a relatively low resolution VHS image format having a 320×480 pixel resolution. A full-length motion picture of two hours in duration at this resolution corresponds to 100 gigabytes of digital video information. By comparison, conventional CD-ROM disks have capacities of about 0.7 gigabytes, and DVD disks have capacities of up to 8 gigabytes.

To address the limitations in storing and transmitting such massive amounts of digital video information, various video compression standards or processes have been established, including MPEG-1, MPEG-2, MPEG-4, and H.26X. These video compression techniques utilize still image compression techniques, referred to as intraframe correlation, of the individual image frames as well as similarities between successive image frames, referred to as interframe correlation, to encode the digital video information and provide a high compression ratio.

Block-matching (BM) motion compensation is a technique well known in the prior art for encoding digital video information. If an image sequence shows moving objects, then their motion within the sequence can be used to create a motion vector for a particular block containing the moving object, also referred to as a macroblock. This motion vector can be used to predict where the macroblock will be later in the sequence. Instead of transmitting a new image, the motion vectors for macroblocks containing the moving objects can be sent instead. Block-matching motion compensation greatly reduces the data that must be transmitted for image sequences containing moving objects. However, when the whole image is panning, expanding, contracting, or turning, the motion vectors of all of macroblocks must be transmitted, greatly decreasing the coding efficiency. To solve this problem, global motion compensation (GMC) techniques are well known in the prior art, such as the "sprite" coding techniques used in MPEG-4 (i.e. ISO/IEC 14496-2). These global motion compensation techniques take into account global image changes between a previous frame and the current frame. Global motion parameters associated with each frame are used to specify individual motion vectors for all pixels in each macroblocks encoded using global motion compensation. In this way, only one set of global motion parameters is required for each frame, increasing the encoding efficiency for video sequences having global image changes.

FIG. 1 shows a typical video decoder 100 according to the prior art as disclosed in U.S. Pat. No. 6,483,877. The video decoder 100 receives a incoming coded video bit stream 102 that is separated through a demultiplexer 104 into quantized discrete cosine transform (DCT) coefficients 106, macroblock motion vector and global motion parameters 108, and an intraframe/interframe distinction flag 110. The quantized DCT coefficient 106 is decoded into an error image 116 through an inverse quantizer 112 and an inverse DCT processor 114. An output image 118 of an interframe/intraframe switching unit 120 is added to the error image 116 through an adder 122 to form a reconstructed image 124.

The interframe/intraframe switching unit 120 switches its output 118 according to the interframe/intraframe coding distinction flag 110. A predicted image synthesizer 126 synthesizes a predicted image 128 that is used for executing the interframe coding. The predicted image synthesizer 126 performs motion compensation operation and fetches prediction blocks from at least one decoded image 130, which is a previously decoded frame stored in a frame memory 128. The predicted image synthesizer 126 performs either block-matching motion compensation or global motion compensation according to the encoding type used for a particular macroblock. In the case of intraframe coding, the interframe/intraframe switching unit 120 outputs the "0" signal 132 and the output of the predicted image synthesizer 126 is not used.

FIG. 2 shows a more detailed block diagram of the predicted image synthesizer 126 of FIG. 1 according to the prior art. The predicted image synthesizer 126 processes global motion compensation and block matching motion compensation in parallel. The macroblock motion vector and global motion parameters 108 are input to a demultiplexer 202, which provides global motion parameters 204, a macroblock motion vector 206, and a selection signal 208 specifying block matching/global motion compensation to a GMC image synthesizer 210, a BM image synthesizer 212, and a switch 214, respectively. The BM image synthesizer 212 synthesizes the predicted image for blocks that are encoded using block-matching motion compensation, and the GMC image synthesizer 210 synthesizes the predicted image for blocks that are encoded using global motion compensation. The respective predicted image data 216 and 218 are output to the switch 214, which selects one of these signals according to the selection signal 208, received from the demultiplexer 202. The predicted image 128 is then output to the switching unit 120, as shown in FIG. 1.

As can be seen from the above description, video decoders supporting both block-matching motion compensation and global motion compensation require the use of two different image synthesizers. A first image synthesizer 212 is used for block-matching motion compensation, and a second image synthesizer 210 is used for global motion compensation. When processing blocks encoded using block-matching image compensation, the GMC image synthesizer 210 is idle. Likewise, when processing blocks encoded using global motion compensation, the BM image synthesizer 212 is idle. This non-optimal solution of requiring two image synthesizers increases the hardware complexity of the video decoder and results in a higher cost. It would be beneficial to combine the functionality of the GMC synthesizer 210 and the BM synthesizer 212 into an integrated unit.

SUMMARY OF INVENTION

It is therefore an objective of the invention to provide an apparatus capable of performing motion compensation for both macroblocks encoded with block-matching and macroblocks encoded with global motion compensation, to solve the above-mentioned problems.

According to one embodiment of the invention, an apparatus is disclosed for performing motion compensation. The apparatus is capable of decoding an incoming coded video bit stream including a plurality of frames. Each frame may include macroblocks encoded using block-matching motion compensation and/or macroblocks encoded using global motion compensation. The apparatus further includes an interpolation unit. The interpolation unit performs interpolation operations on each macroblock encoded with block-matching or global motion compensation in each frame of the incoming coded video bit stream. When processing a current macroblock, if the current macroblock is encoded using global motion compensation, the interpolation unit performs the interpolation operations according to a global motion vector translated from the global motion parameters.

Also according to the present invention, a predicted image synthesizer in a video decoder is disclosed for decoding a video bit stream and generating a predicted image. The video bit stream includes a plurality of frames having first macroblocks encoded using block-matching compensation and second macroblocks encoded using global motion compensation. The video bit stream includes macroblock motion vectors indicating motion vectors of the first macroblocks and global motion parameters associated with the plurality of frames indicating a motion vector of each pixel in the second macroblocks. The predicted image synthesizer comprises a translation unit receiving the global motion parameters, and translating the global motion parameters into a global motion vector which is in a form substantially identical to that of the macroblock motion vector, and a interpolation unit for receiving at least one prediction block in a decoded image 130, which is a previously decoded frame, receiving the global motion vector, performing interpolation operations, and generating the prediction image.

These and other objectives of the claimed invention will become obvious to those of ordinary skill in the art after reading the following detailed description of the preferred embodiment that is illustrated in the various figures and drawings.

BRIEF DESCRIPTION OF DRAWINGS

FIG. 7 is a matrix showing half-pel (half pixel) interpolation for luminance global motion compensation performed by the predicted image synthesizer of FIG. 3.

FIG. 8 is a matrix showing quarter-pel (quarter pixel) interpolation for chrominance global motion compensation performed by the predicted image synthesizer of FIG. 3.

DETAILED DESCRIPTION

Figure 1:
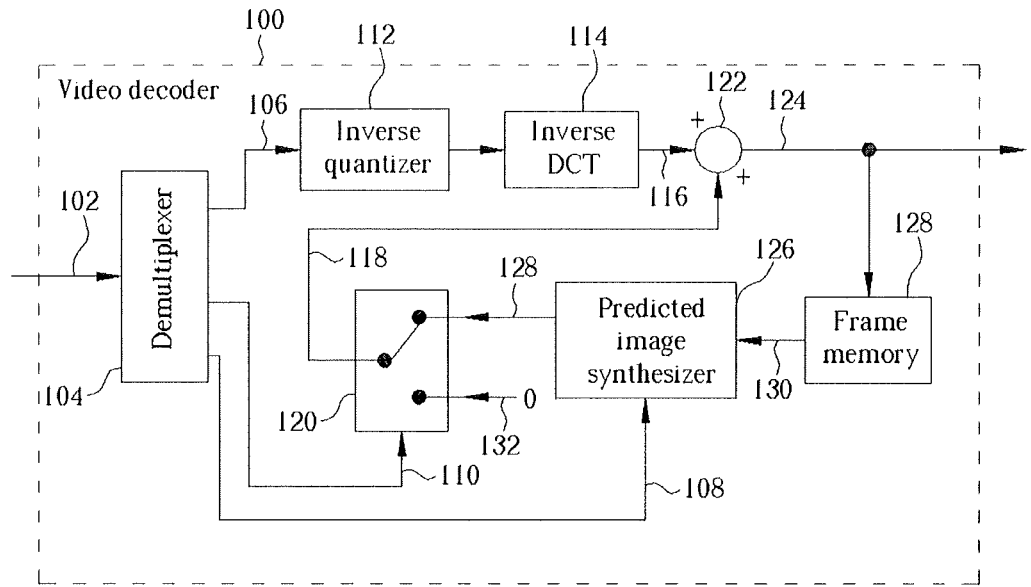
FIG. 1 is a typical video decoder according to the prior art.
Figure 2:
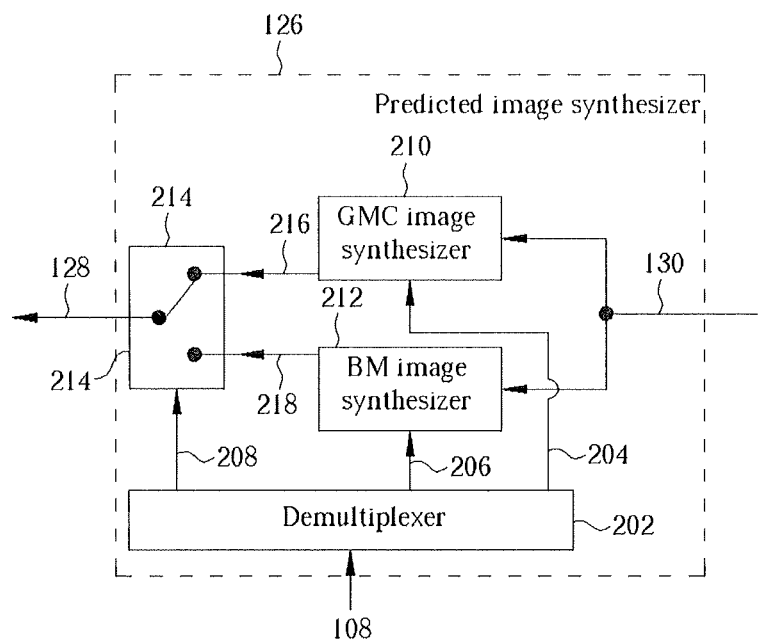
FIG. 2 is a block diagram of the predicted image synthesizer of FIG. 1 according to the prior art.
Figure 3:
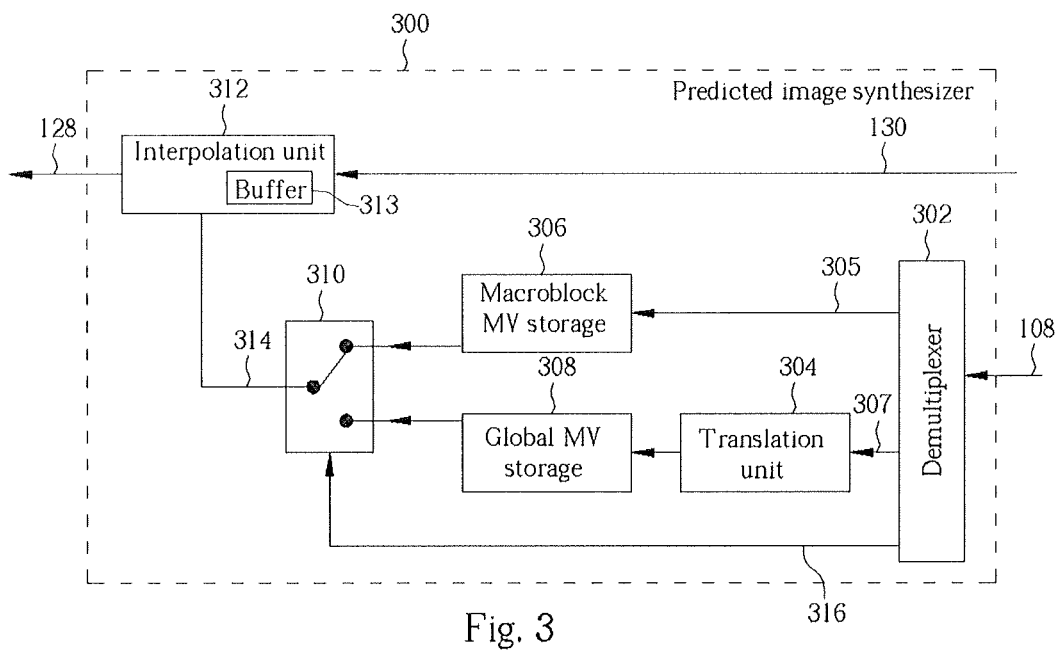
FIG. 3 is a block diagram of a predicted image synthesizer according to the present invention.

FIG. 3 is a block diagram of a predicted image synthesizer 300 according to the present invention. The predicted image synthesizer 300 can be used in a video decoder such as the video decoder 100 shown in FIG. 1. In FIG. 3, all signals that contain the same information as signals in FIG. 1 are labeled using the same numerical labels as in FIG. 1. The predicted image synthesizer 300 includes a demultiplexer 302, a translation unit 304, a macroblock MV (motion vector) storage unit 306, a global MV (motion vector) storage unit 308, a switching unit 310, and an interpolation unit 312. The demultiplexer 302 receives the macroblock motion vector and the global motion parameters 108 derived from the incoming coded video bit stream. At the beginning of each frame, the global motion parameters 307 are passed to the translation unit 304. The translation unit 304 converts the global motion parameters 307 into a global motion vector for luminance (luminance global motion vector) and a global motion vector for chrominance (chrominance global motion vector). The luminance global motion vector and the chrominance global motion vector can be used during interpolation operations at the macroblock level for all macroblocks encoded using global motion compensation throughout the frame. The luminance global motion vector and the chrominance global motion vector are stored in the global MV storage unit 308. For all macroblocks that are encoded using block-matching motion compensation, at least one macroblock motion vector is included within the macroblock. The macroblock motion vector 305 is contained within the macroblock motion vectors and global motion parameters 108, and is passed to the predicted image synthesizer 300. The macroblock motion vector 305 is then stored in the macroblock MV storage unit 306. According to the MPEG-4 specification, the macroblock motion vector 305 is actually a macroblock motion vector for luminance (luminance macroblock motion vector). A macroblock motion vector for chrominance (chrominance macroblock motion vector) can be obtained by performing calculation on the luminance macroblock motion vector. To save the space of the Macroblock MV storage 306, only the macroblock motion vector 305 (that is, the luminance macroblock motion vector) is stored in the Macroblock MV storage 306. The chrominance macroblock motion vector will be calculated and obtained in the Interpolation unit 312 in this embodiment. It should be noted that the macroblock MV storage unit 306 may also be replaced by a straight connection to the switching unit 310 in another embodiment of the present invention. The switching unit 310 is used to either pass the macroblock motion vector from the Macroblock MV storage 306 or the luminance/chrominance global motion vector from the global MV storage unit 308 to the interpolation unit 312 according to the motion compensation type 316.

The interpolation unit 312 reads at least one prediction block in a decoded image 130, and the location of the prediction block in the decoded image is determined by the motion vector 314 received from the switching unit 310. The interpolation unit 312 then performs both luminance and chrominance interpolation operations of the corresponding prediction block. The received motion vector 314 may be the macroblock motion vector retrieved from the macroblock MV storage unit 306 or the luminance/chrominance global motion vector retrieved from the global MV storage unit 308. The interpolation unit 312 receives the decoded image 130 and the motion vector 314, performs interpolation operations, and outputs a predicted image 128 that is used for executing the interframe coding in a video decoder such as the video decoder 100 shown in FIG. 1. The interpolation unit 312 may further include a buffer 313 for temporarily storing the interpolation operation result corresponding to the different macroblock motion vectors in a macroblock so as to properly perform the interpolation operations of a macroblock. For example, when performing bi-directional interpolation for a block matching macroblock, the interpolation unit 312 may temporarily store the forward prediction interpolation result in the buffer 313, combine with the later backward prediction interpolation result, and then obtain the final bi-directional interpolation result.

Figure 4:
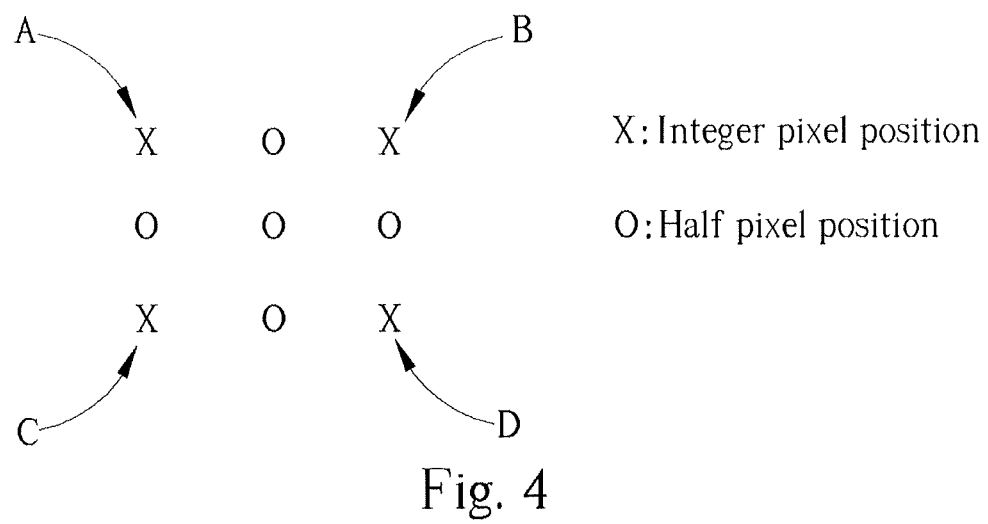
FIG. 4 is a diagram showing half-pel (half pixel) interpolation for luminance and chrominance block-matching compensation performed by the predicted image synthesizer of FIG. 3.
Figures 5, 6:
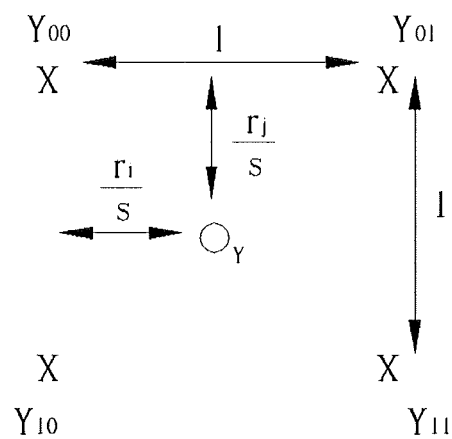
FIG. 5 is a matrix showing half-pel (half pixel) interpolation for the diagram of FIG. 4.
FIG. 6 is a diagram showing global motion compensation according to the prior art.

To further explain the luminance and chrominance interpolation operations performed by the interpolation unit 312, please refer to FIG. 4 and FIG. 5. FIG. 4 is a diagram showing half-pel (half pixel) interpolation for luminance and chrominance block-matching compensation performed by the predicted image synthesizer 300 of FIG. 3. FIG. 5 is a matrix showing the resulting half-pel (half pixel) bilinear interpolation for the diagram of FIG. 4. In FIG. 4 there are four integer pixel positions (A, B, C, D), labeled in FIG. 5 as ($I_A$, $I_B$, $I_C$, and $I_D$), as well as five half-pixel positions, labeled in FIG. 5 as ($H_1$, $H_2$, $H_3$, $H_4$, $H_5$). When performing motion compensation for macroblocks encoded using block-matching motion compensation, the present invention uses the same half-pel (half pixel) bilinear interpolation process of the prior art. To briefly describe the bilinear interpolation calculations, the following formulas show the interpolation calculations for the pixel positions: $I_A$, $H_1$, $H_2$, and $H_3$. (The remaining pixel positions are calculated in the same manner, as is well known in the prior art.)

$$I_A = I_A$$

$$H_1 = (I_A + I_B + 1 - \text{rounding\_control})/2$$

$$H_2 = (I_A + I_C + 1 - \text{rounding\_control})/2$$

$$H_3 = (I_A + I_B + I_C + I_D + 2 - \text{rounding\_control})/4 \ldots,$$

where the rounding_control parameter is a value of 0 or 1, and is derived from the incoming coded video bit stream.

FIG. 6 shows a diagram showing global motion compensation according to the prior art. Global motion compensation according to the prior art involves converting the global motion parameters into an individual motion vector for each pixel in each macroblock encoded using global motion compensation. In FIG. 6 there are again four integer pixel positions ($Y_{00}$, $Y_{01}$, $Y_{10}$, and $Y_{11}$) as well as a non-integer pixel position Y. The non-integer pixel position Y has a vertical distance of ($r_j/s$) and a horizontal position of ($r_i/s$), where s is specified by sprite_warping_accuracy, as defined in the MPEG-4 (ISO/IEC 14496-2) specification. The present invention takes advantage of the fact that when the no_of_sprite_warping_point parameter in MPEG-4 is set to a value of 0 or a value of 1, the global motion parameters can be converted into a global motion vector having the same value for all pixels in the frame. This means that instead of doing global motion compensation on a per-pixel bases, as is done in the prior art, the present invention can also perform global motion compensation on a per-macroblock basis using a single motion vector for each macroblock. In this way, almost the same hardware as is used in the prior art BM image synthesizer 212 can be used to perform both block-matching motion compensation and global motion compensation in the present invention.

FIG. 7 shows a diagram illustrating half-pel (half pixel) bilinear interpolation for luminance global motion compensation performed by the interpolation unit 312 of FIG. 3. When the no_of_sprite_warping_point parameter in MPEG-4 is set to a value of 0 or a value of 1, the luminance interpolation operations of FIG. 6 can be reduced to the matrix shown in FIG. 7. The matrix shown in FIG. 7 is equivalent to the matrix shown in FIG. 5 and this implies the luminance and chrominance interpolation operations for block-matching compensation and the luminance interpolation operations for global motion compensation can be performed using the same interpolation unit 312 at a half-pel resolution.

FIG. 8 is a diagram showing quarter-pel (quarter pixel) bilinear interpolation for chrominance global motion compensation performed by the interpolation unit 312 of FIG. 3. When the no_of_sprite_warping_point parameter in MPEG-4 is set to a value of 0 or a value of 1, the chrominance interpolation operations of FIG. 5 can be reduced to the matrix shown in FIG. 7. FIG. 7 is simply a quarter-pel matrix which is solved using the same bilinear interpolation process as the half-pel matrix but at twice the resolution. To briefly describe the interpolation calculations at quarter-pel, the following formulas show the interpolation calculations for the pixel positions: $I_A$, $Q_1$, $H_2$, $Q_4$, $Q_5$, $Q_6$, $H_9$, $Q_{10}$, and $H_{11}$. (The remaining pixel positions are calculated in the same manner.)

$$I_A = I_A$$

$$Q_1 = (3 I_A + I_B + 2 - \text{rounding\_control})/4$$

$$H_2 = (I_A + I_B + 1 - \text{rounding\_control})/2$$

$$Q_4 = (3 I_A + I_C + 2 - \text{rounding\_control})/4$$

$$Q_5 = (9 I_A + 3 I_B + 3 I_C + I_D + 8 - \text{rounding\_control})/16$$

$$Q_6 = (3 I_A + 3 I_B + I_C + I_D + 4 - \text{rounding\_control})/8$$

$$H9 = (I_A + I_C + 1 - \text{rounding\_control})/2$$

$$Q10 = (3 I_A + I_B + 3 I_C + I_D + 4 - \text{rounding\_control})/8$$

$$H11 = (I_A + I_B + I_C + I_D + 2 - \text{rounding\_control})/4 \ldots,$$

where the rounding_control parameter is a value of 0 or 1, and is derived from the incoming coded video bit stream.

It should be noted that the translation unit 304 converts the global motion parameters 307 received for each frame into a luminance global motion vector and a chrominance global motion vector for the frame. The following formulas describe the conversion process implemented by the translation unit 304 to covert the global motion parameters into the luminance/chrominance global motion vectors used during interpolation operations for macroblocks encoded using global motion compensation with no_of_sprite_warping_point equal to 0 and no_of_sprite_warping_point equal to 1, respectively. The luminance global motion vector is a half-pel precision motion vector and the chrominance global motion vector is a quarter-pel precision motion vector. Hence, these macroblocks encoded using global motion compensation can be treated as if they were block matching macroblocks with prediction mode of "frame_prediction" and with the following luminance/chrominance global motion vectors respectively for the luminance/chrominance components.

For GMC macroblocks with (no_of_sprite_warping_point==0), (sprite_enable=='GMC'), and (video_object_layer_shape=='rectangle'):

$$MV^{GMC\_Y} = (MV_x^{GMC\_Y}, MV_y^{GMC\_Y}) = (0, 0)$$

$$MV^{GMC\_CbCr} = (MV_x^{GMC\_CbCr}, MV_y^{GMC\_CbCr}) = (0, 0)$$

For GMC macroblocks with (no_of_sprite_warping_point==1), (sprite_enable=='GMC'), and (video_object_layer_shape=='rectangle'):

$$MV^{GMCY} = (MV_x^{GMCY}, MV_y^{GMCY}) = (i_0', j_0') = ((s/2)du[0], (s/2)dv[0])$$

$$MV^{GMC\_CbCr} = (MV_x^{GMC\_CbCr}, MV_y^{GMC\_CbCr}) = ((i_0' >> 1)|(i_0' \& 1), (j_0' >> 1)|(j_0' \& 1))$$

where $$(i_0', j_0') = ((s/2)du[0], (s/2)dv[0])$$

where du[0] and dv[0] are the global motion parameters derived from the incoming coded video bit stream and s is specified by sprite_warping_accuracy, as defined in the MPEG-4 (ISO/IEC 14496-2) specification.

It is noted that the above equations apply when (no_of_sprite_warping_point==0 or 1), (sprite_enable=='GMC'), and (video_object_layer_shape=='rectangle'). But the present invention can also be used when the values of sprite_enable and video_object_layer_shape are different. People skilled in the art will appreciate that as long as the (no_of_sprite_warping_point==0 or 1), this invention applies even when the values of sprite_enable and video_object_layer_shape are different from the above and the equations become different.

Figure 9:
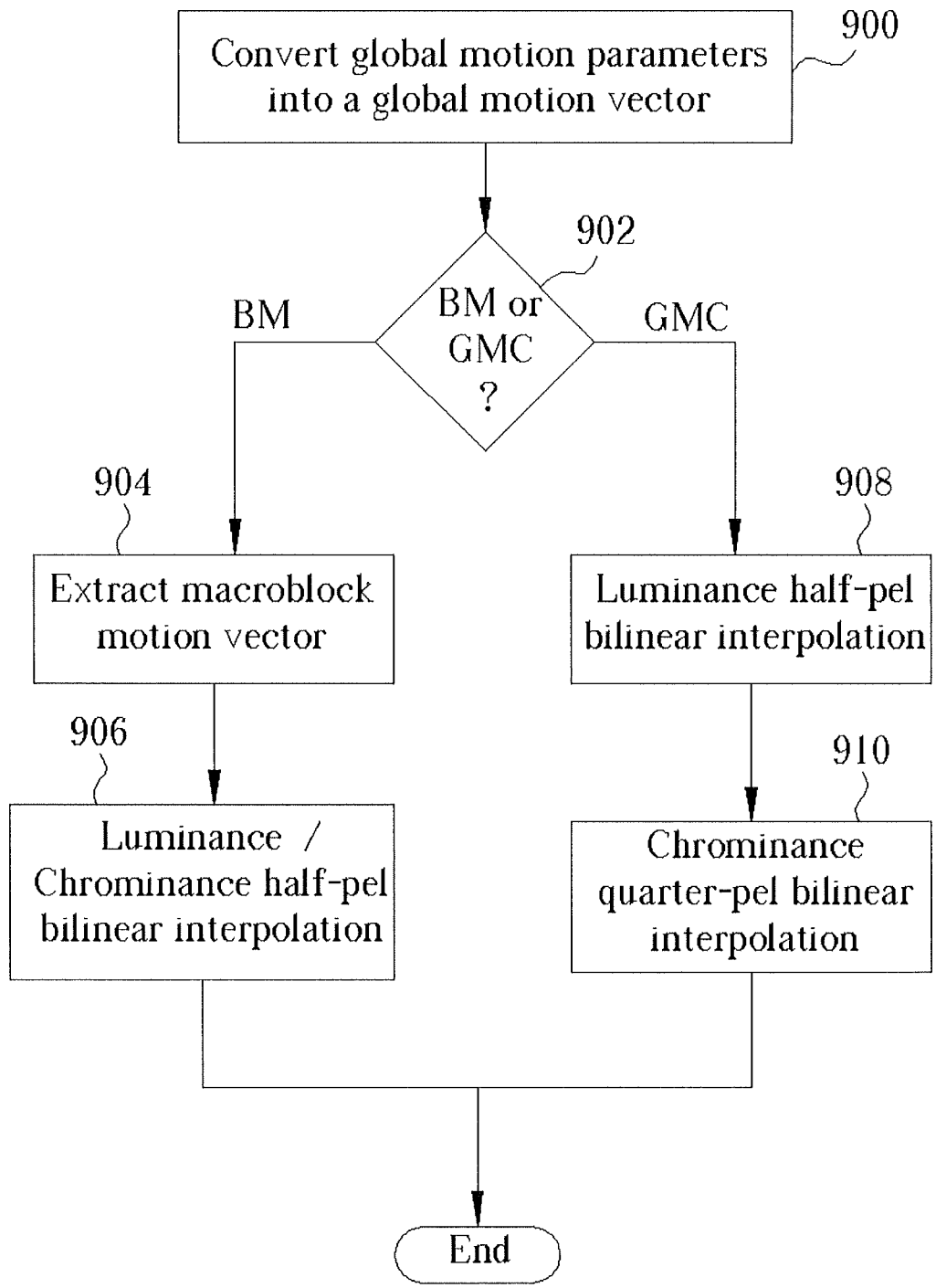
FIG. 9 is a flowchart describing a method of processing an incoming coded video bit stream including a plurality of frames according to the present invention.

FIG. 9 shows a flowchart describing a method of processing an incoming coded video bit stream comprising a plurality of frames according to the present invention. Each frame may include a plurality of macroblocks encoded using block-matching motion compensation and/or a plurality of macroblocks encoded using global motion compensation. The flowchart contains the following steps:

Step 900: For each frame received in the incoming video stream, convert the global motion parameters associated with the frame into a luminance global motion vector and a chrominance global motion vector. Store the luminance global motion vector and the chrominance global motion vector for later global motion compensation luminance/chrominance interpolation operations. Proceed to step 902.

Step 902: When decoding a current macroblock, determine whether the current macroblock is encoded using block-matching motion compensation or global motion compensation. If block-matching motion compensation, proceed to step 904, otherwise if global motion compensation, proceed to step 908.

Step 904: Extract the macroblock motion vectors stored in the current macroblock.

Step 906: Perform the luminance and chrominance bilinear interpolation operations according to the macroblock motion vectors extracted in step 904. Use a half-pel resolution for both luminance and chrominance. Processing is complete.

Step 908: Perform the luminance bilinear interpolation operation according to the luminance global motion vector stored in step 900. Use half-pel resolution and proceed to step 910 when finished.

Step 910: Perform the chrominance bilinear interpolation operation according to the chrominance global motion vector stored in step 900. Use quarter-pel resolution and when finished, processing is complete.

In contrast to the prior art, the present invention performs bilinear interpolation operations on macroblocks encoded using global motion compensation according to a luminance global motion vector and a chrominance global motion vector so that the block-matching motion compensation and global motion compensation can be integrated into a single unit. The luminance/chrominance global motion vectors are converted from a set of global motion parameters transmitted with each frame in the incoming coded video bit stream. For an MPEG-4 compliant coded video bit stream having GMC macroblocks with the no_of_sprite_warping_point parameter set to either 0 or 1, the global motion compensation calculations can be simplified to resemble the interpolations operations normally performed for block-matching. The difference is that for the chrominance interpolation operations for macroblocks encoded using global motion compensation, a quarter-pel resolution is used. For luminance and chrominance interpolation operations for macroblocks encoded using block-matching motion compensation and for luminance interpolation operations for macroblocks encoded using global motion compensation, a half-pel resolution is used.

It should be noted that when a frame includes only macroblocks encoded using block-matching motion compensation, there may be no global motion parameters associated with the frame. In such case, the present invention will not perform the conversion process of converting the global motion parameters into a luminance global motion vector and a chrominance global motion vector because there are no global motion parameters associated with in the frame.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A video decoding apparatus for decoding a coded bitstream having both macroblocks encoded using block-matching motion compensation and macroblocks encoded using global-matching motion compensation, comprising:
   a macroblock motion vector storage for storing a macroblock motion vector received from the coded bitstream;
   a translation unit for generating a global motion vector from a global motion parameter received from the coded bitstream;
   a global macroblock motion vector storage for storing the global motion vector;
   an interpolation unit for generating a predicted image based on the macroblock motion vector and a decoded image when a current macroblock received from the coded bitstream is encoded using block-matching motion compensation, wherein the same interpolation unit is also used for generating another predicted image based on the global motion vector and the decoded image when the current macroblock received from the coded bitstream is encoded using global-matching motion compensation instead of using the global motion parameter received from the coded bitstream.

2. The video decoding apparatus of claim 1, wherein the macroblock motion vector storage only stores luminance macroblock motion vectors, and the video decoding apparatus further comprises a calculator for calculating chrominance motion vectors according to the luminance macroblocks.

3. The video decoding apparatus of claim 1, wherein the interpolation unit performs half-pel bilinear interpolation calculation if the current macroblock received from the coded bitstream is encoded using block-matching motion compensation.

4. The video decoding apparatus of claim 3, wherein the global motion vector derived from the global motion parameter is the same to all pixels in a frame, and the interpolation unit is operated on a per-macroblock basis for each macroblock instead of performing global motion compensation on a per-pixel basis.

5. The video decoding apparatus of claim 4, wherein the interpolation unit performs chrominance interpolation for the current macroblock with a quarter-pel resolution if the current macroblock received from the coded bitstream is encoded using global-matching motion compensation.

6. The video decoding apparatus of claim 1, wherein the coded bitstream is a MPEG-4 compliant coded video bit stream.

7. The video decoding apparatus of claim 6, wherein the parameter no_of_sprite_warping_point of the MPEG-4 compliant coded video bit stream is set as zero or one.

8. The video decoding apparatus of claim 1, further comprising a frame memory for supplying the decoded image to the interpolation unit wherein the decoded image is a reference image under an inter-frame coding scheme.

9. The video decoding apparatus of claim 1, wherein a major portion of hardware of the interpolation unit is shared for decoding the current macroblock encoded for both the global-matching motion compensation and the block-matching motion compensation.

10. The video decoding apparatus of claim 1, wherein the video decoding apparatus only needs one interpolation unit instead of two sets of interpolation for decoding the current macroblock encoded by the global-matching motion compensation and the block-matching motion compensation respectively.

* * * * *